Sept. 8, 1964
J. K. MARIS
TRAINING AID
3,147,557
Filed July 25, 1962
3 Sheets-Sheet 1
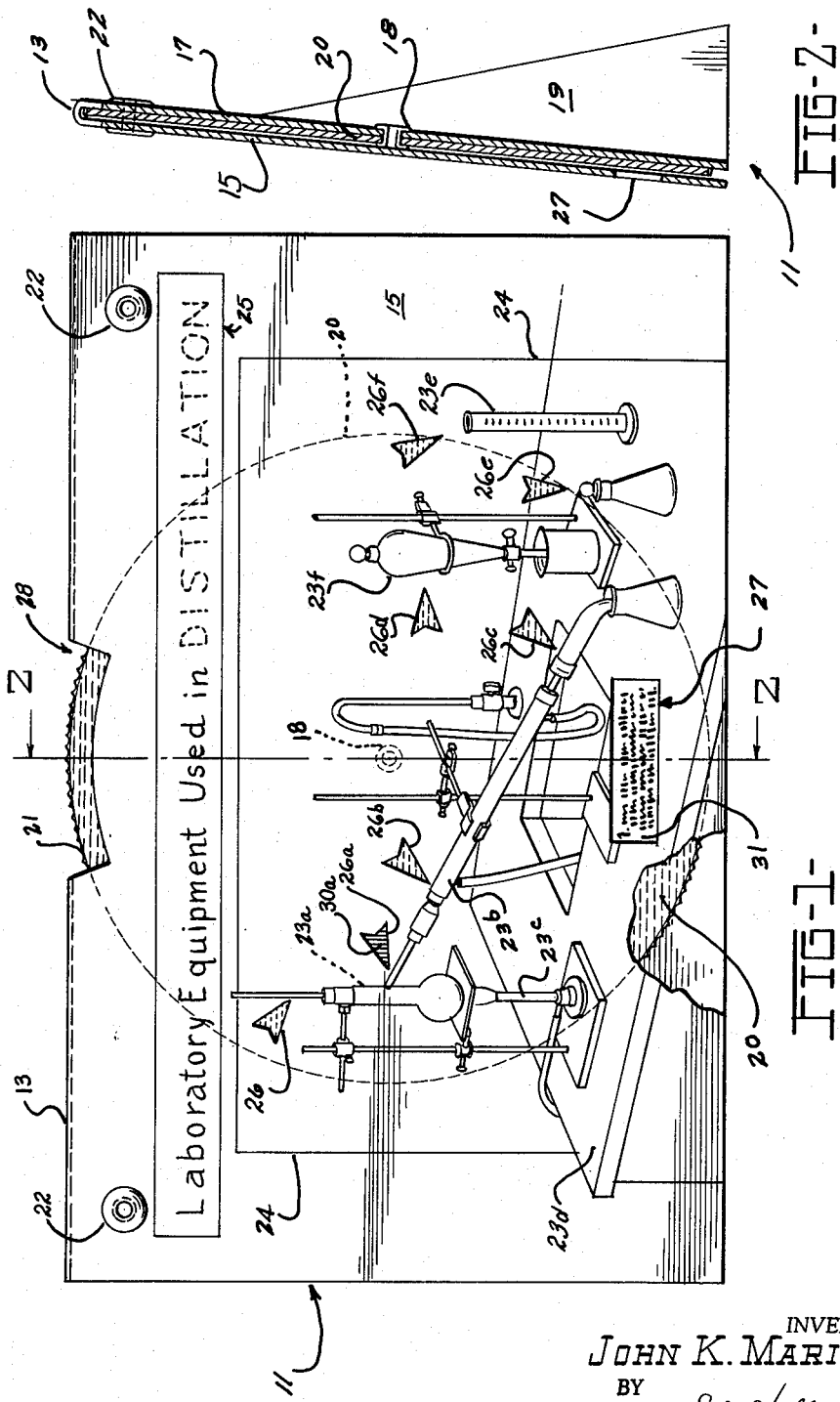
INVENTOR:
JOHN K. MARIS.
BY
E. J. Holler &
W. A. Schaich
ATTNYS.

Sept. 8, 1964 J. K. MARIS 3,147,557
TRAINING AID
Filed July 25, 1962 3 Sheets-Sheet 2
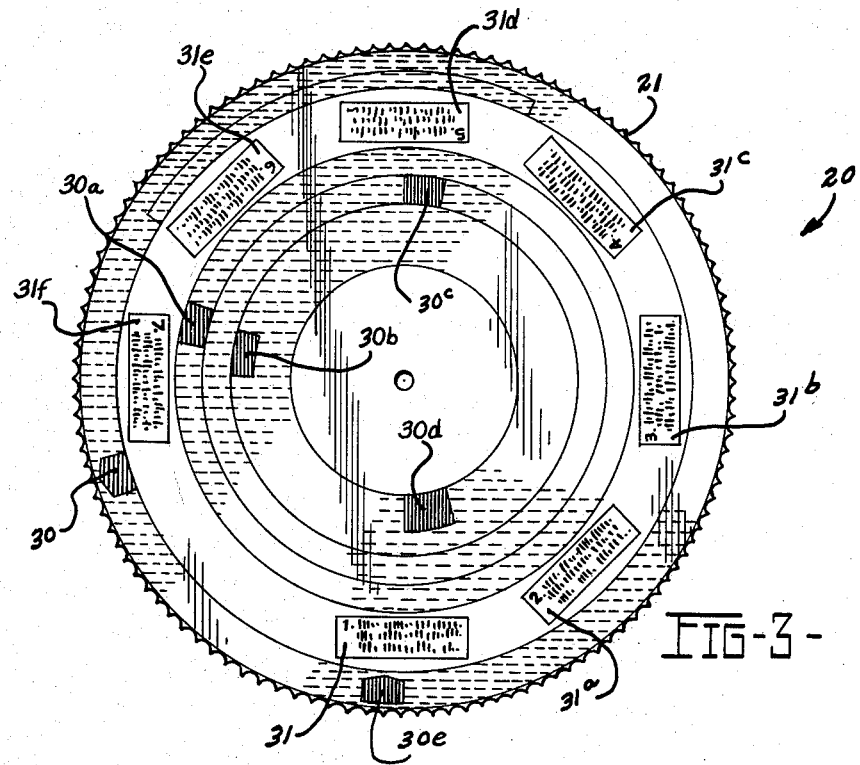
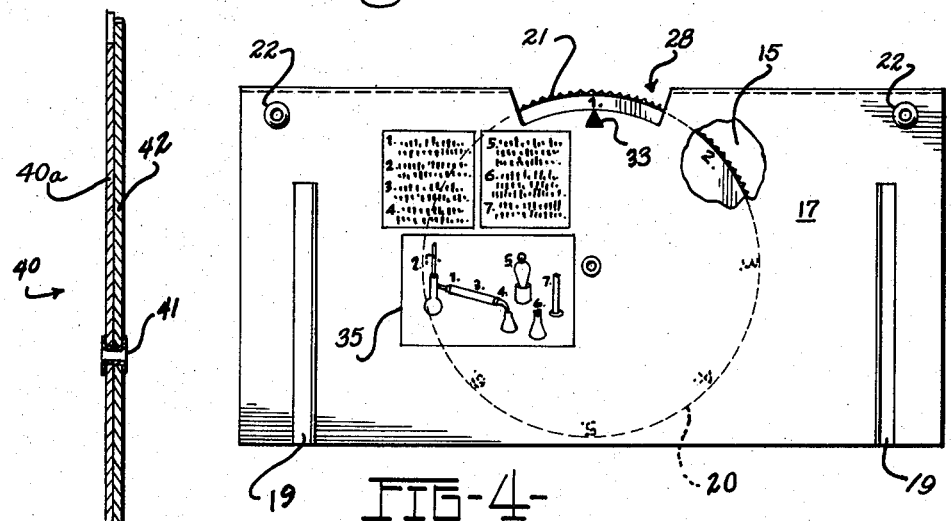
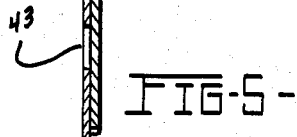
INVENTOR:
JOHN K. MARIS.
BY
E. J. Holler &
W. A. Schaich
ATTNYS Sept. 8, 1964    J. K. MARIS    3,147,557
TRAINING AID
Filed July 25, 1962    3 Sheets-Sheet 3
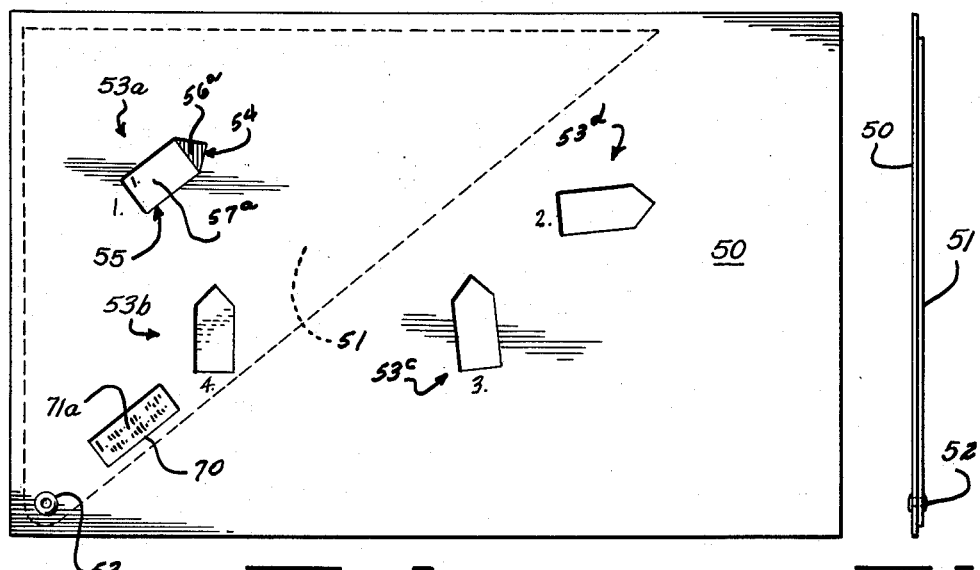
FIG-6-    FIG-7-
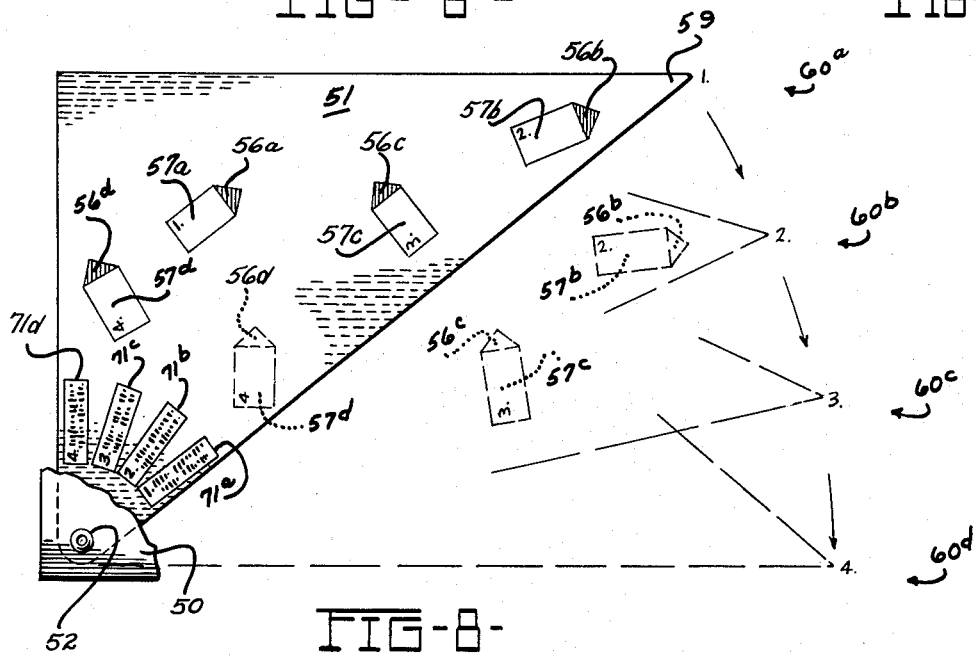
FIG-8-
INVENTOR:
JOHN K. MARIS.
BY
E. J. Holler &
W. A. Schaich
ATTNYS.

United States Patent Office 3,147,557
Patented Sept. 8, 1964

3,147,557
TRAINING AID
John K. Maris, Toledo, Ohio, assignor, by mesne assignments, to Owens-Illinois Glass Company, Toledo, Ohio, a corporation of Ohio
Filed July 25, 1962, Ser. No. 212,249
3 Claims. (Cl. 35—54)

The present invention relates to the field of training aids. More particularly, the present invention relates to a visual training aid of utility in illustrating various processes, techniques, equipment and operations of a somewhat technical nature, such as is exemplified by the field of chemistry. The training aid of this invention finds particular utility in introducing the beginning student to technical subjects of the general field of science.

It is an object of the present invention to provide a training and teaching aid that is of novel construction and by reason thereof enables a series of process steps, techniques or a particular apparatus setup or operation to be vividly and graphically illustrated.

It is also an object of the present invention to provide such a training aid which is constructable of relatively inexpensive materials and is of such flexibility that it can be adapted for the teaching or demonstrating of a wide variety of subjects embraced by the sciences and as well can be adapted for many more complicated apparatus setup or unit operations employed in many industrial facilities. The invention is of particular utility in demonstrably teaching the use and function of individual components such as articles of scientific glassware arranged in combination to conduct various laboratory experiments and procedures.

The foregoing and many other objects of the present invention will become apparent from the following detailed description taken in conjunction with the annexed sheet of drawings on which there is presented, for purposes of illustration only, several of the more preferred embodiments of the present invention.

In the drawings:

FIG. 1 is a head on plan view of the training aid of the present invention showing it in assembled form as it would be used, but with a portion broken away to reveal details of construction.

FIG. 2 is a sectional view taken on the line 2—2 of FIG. 1.

FIG. 3 is a plan view of one of the components of the assembly, namely the disk component, shown in dotted outline in FIG. 1.

FIG. 4 is a plan view of the rear side of the training aid assembly shown in FIG. 1, and having a portion broken away for clarity of illustration.

FIG. 5 is a sectional view of a training aid composed of an assembly of components, in accordance with an extremely simplified embodiment of the present invention.

FIG. 6 is a view, somewhat like FIG. 1, but illustrating a somewhat different assembly of components forming a training aid in accordance with another embodiment of the present invention.

FIG. 7 is a side or edge view of the assembly shown in FIG. 6.

FIG. 8 is a plan view of one of the components of the assembled training aid illustrated in FIG. 6 and illustrating the movement thereof for accomplishing the visual illustration.

In its simplest embodiment the training aid for portraying the carrying out of a technical operation, process or the employment of various components of apparatus useful in a particular science is composed of a principal planar member having shiftably or movably secured thereto a second member located behind the first planar member, said first member bearing a pictorial depiction of a plurality of elements having a collective preselected purpose, said first member including a plurality of individual indicia cut outs or windows proximately located with respect to said individual elements or proximate to the steps of the depicted operation and said second member having on the surface thereof, flush with the first planar member, a plurality of attention drawing indicia which are individually and sequentially visible in different of said cut outs as said second member is sequentially moved from one position to another.

In accordance with a preferred embodiment of the present invention, the second planar member is provided additionally with a plurality of individual datum or informational messages which are in spaced relationship with each other, said datum or messages pertaining to the individual elements or steps of the depicted operation, said datum being spaced in preselected spatial relationship with said indicia and said first member being provided with a datum window in addition to said indicia windows or cut outs, the elements being so located in relation to each other that a proper position of the second planar member will reveal an attention drawing indicia in a window cut out proximate a given element and simultaneously there will be revealed an individual datum or informational message corresponding to the particular element to which attention is drawn by the indicia in the window cut out.

Referring now more specifically to the drawings, there is disclosed in FIGS. 1 and 2 a training aid 11 constructed in accordance with the preferred embodiment of the invention. The training aid is composed principally of a sheet of relatively stiff material, such as cardboard or the like, which has been folded over about the fold line 13 to form a front panel 15 and a rear panel 17. The back panel 17, as more clearly shown in FIG. 2, has secured rotatably thereto and centrally thereof a circular disk 20, which is shown in more detail in FIG. 3 and will be discussed in more detail hereinafter. The disk 20 is thus sandwiched between the front and rear panels 15 and 17 and is carried principally on the back panel by the pin member 18. The panels 15 and 17 are secured together at their corners by ring clamps 22 which themselves contain holes whereby the training aid can be hung upon suitable nails or the like. Spaced support members 19 of triangular contour, secured to rear panel 17, serve as a support for standing the training aid on a desk. The front panel 15 contains on its facing surface a pictorial illustration of a plurality of pieces 23 of laboratory apparatus, as for example, the side arm distillation flask 23a, the condenser 23b, Bunsen burner 23c and desk 23d. These and the other laboratory equipment are connected or proximately arranged in such fashion that the illustrated assemblage is useful for carrying out a particular chemical experiment. As shown in the drawings, the experiment or operation depicted is the process of distillation as is further attested to by the title 25 (in dotted line letters) carried on the front panel 15.

The pieces of apparatus are illustrated resting on a desk 23d and have as a background either the desk 23d which is black in color or the area enclosed by the line 24 which is a medium grey color. The particular colors are not critical, of course, but are disclosed only in the interest of completeness of disclosure and for illustrating the contrast in colors used for vividness and the clarity of illustration possible using the technique of this invention. Proximate certain of the pieces of depicted laboratory apparatus as, for example, the laboratory side arm distillation flask 23a, the condenser 23b, the separation funnel 23f and the graduate cylinder 23e, is located a plurality of cut outs designated by the numerals 26, 26a, 26b, 26c, 26d, 26e and 26f. The front panel 15 also includes a generally rectangular cutaway window 27. Finally, front and rear panels, 15 and 17, are cut away as at 28 proximate the fold line, which cutaway extends sufficiently down on each side that the peripheral portion of the disk 20 is observable and its serrated edge 21 can be hand contacted for rotation of the disk about pin 18.

The disk, which is shown in more detail in FIG. 2, bears on it in spaced relationship a plurality of spot indicia 30, 30a, 30b, 30c, 30d, and 30e which are red in color. It also has a series of rectangular portions which bear different printed messages identified by the reference numerals 31, 31a, 31b, 31c, 31d, 31e and 31f, or may contain datum appropriate to a particular operation, function, process or the like. These messages as can be seen are spaced approximately an equal distance from the center of the disk, whereas the red spot indicia, e.g. 30, 30a . . . etc. are spaced different distances from the center in addition to apparent random radial location. The location, however, is not entirely random since it is very carefully interrelated with the location of the cut outs 26, 26a . . . etc. in the front panel member 15 and also in relation to the datum or informational messages 31, 31a . . . etc., referred to just hereinabove. The red colored spot indicia 30, 30a . . . etc. are contained in annular zones which are colored to blend in with background colors contained in the illustration on the facing of front panel 15. Since the various colors are not capable of exact illustration on the drawings, it should be pointed out that the annular zone containing red spot indicia 30b and 30d is grey in color; the annular zone containing spot indicia 30c is black (like desk 23d); the annular zone containing spot indicia 30a is grey as is the annular zone containing spot indicia 30 and 30e; while the annular zone containing the messages 31, 31a . . . etc. is white (for contrast with the black color of the desk 23d).

The reverse side of the disk contains, as can be seen by reference to FIG. 4, a plurality of numerals 1 through 7 in spaced relationship proximate the peripheral margin of the disk. These numerals are spaced in relation to the red colored spot indicia 30, 30a . . . etc. and also in relation to the spaced explanatory message portions 31, 31a . . . etc. The back panel bears, proximate to the cutaway 28, an index arrow 33 which enables one to select a proper position by aligning therewith any of the numerals 1 through 7 corresponding to data or informational messages 31, 31a . . . etc. on the front side of disk 20.

The spot indicia 30, 30a . . . etc. and the cut outs 26, 26a . . . etc. are so arranged that rotation of the disk 20 to a given position (by matching numerals on back margin with the index 33) will cause an appropriate spot indicia 30, 30a . . . etc. to appear in registry through one of the cut outs 26, 26a . . . etc. in the front panel simultaneously with the appearance of the appropriate datum or message 31, 31a . . . etc. in the message window 27. The messages or datum are so composed as to relate to or be directed in context to the particular piece of laboratory apparatus pointed to or designated by the cut out having therebeneath in registry the spot indicia of contrasting color which draws attention to the particular piece of laboratory apparatus which is explained or discussed on one of the messages 31, 31a . . . etc. appearing in the datum window 27.

For clarity of disclosure, Table I below includes a tabulation of the related elements as pertains to the several positions of the disk.

Table I

| Message | Message appears at cut out | Spot indicia on disk | Cut out in panel 15 |
|---|---|---|---|
| 1 (31)* | 27 | 30a* | 26a* |
| 2 (31a) | 27 | 30 | 26 |
| 3 (31b) | 27 | 30d | 26b |
| 4 (31c) | 27 | 30c | 26c |
| 5 (31d) | 27 | 30b | 26d |
| 6 (31e) | 27 | 30 | 26e |
| 7 (31f) | 27 | 30e | 26f |

*Drawing reference numeral.

Reading the table horizontally, one can see that message 1 (reference numeral 31) appears in information window cut out 27 as red spot indicia 30a appears in registry with cut out 26a in panel 15. The other relationships are apparent by reference to this table in connection with FIGS. 1 and 3. It will be noted that in this illustration one of the spot indicia 30 is visible at different times in two separate datum windows, e.g. 26 and 26e.

The back panel 17 contains preferably on its rear face a somewhat smaller duplication 35 of the array of pieces of laboratory equipment contained on the facing side of the front panel. It also contains a tabulation of the 7 messages 31, 31a . . . etc. Numerals are located next to the appropriate elements corresponding to the cut outs 26, 26a . . . etc. in the front panel so that the one using the aid can stand in back of the teaching aid and by use thereof, in conjunction with the index 33 and the peripherally located numerals on the back side of the disk, select any of the 7 positions and know that the appropriate message is appearing in the window 27 and, as well, that the proper spot indicia is calling the viewer's attention to the proper piece of equipment or step of the process. Consequently, the user can proceed with confidence with any appropriate supplemental lecture as the sequence of indicia are caused to appear individually in the several cut outs proximate the several pieces of laboratory equipment. The datum, information or message corresponding to the particular elements follows a logical sequence in the carrying out of the, for example, distillation operation depicted.

FIG. 5 illustrates in section an extremely simplified training aid 40 composed simply of a first or front panel member 40 having affixed to it as by pin 41, in rotatable fashion, a rear panel member 42 which would bear the spot indicia and the spaced individual messages. The front panel member 40 bears, although not shown, a depiction of any given laboratory apparatus or unit operation and includes cut outs 43. Consequently, the rear panel 42 can be rotated in sequential fashion from position to position bringing different spot indicia in line or in registry with the different cut outs 43 in the front panel member 40 and simultaneously a datum message in the data window cut out (not shown). This extremely simplified embodiment is not as eminently desirable as the embodiment shown in FIGS. 1 through 4, since the disk-like member is not carried in protected fashion as in the previous embodiment shown in FIG. 5 nor is a stationary back member provided to indicate what message is being illustrated forwardly. The edges of the panels 40 or 42 may also become bent, worn and even destroyed through use. In the embodiment of FIGS. 1 through 3, the disk 20 is carefully protected by the front and rear panels 15 and 17. Furthermore, in the preferred embodiment the disk is not affixed to the front panel carrying the pictorial illustration of the process and therefore such does not interfere with the vividness of the illustration.

Another embodiment of a training aid, in accordance with the present invention, is shown in FIGS. 6, 7 and 8 wherein there is illustrated a generally two-piece construction composed of a facing planar member 50 and a shiftable backing member 51 in flush relationship and pivotably secured in the corner as by pin 52. The backing member 51 is not a disk as in previous embodiments, but is generally triangular in contour as shown in dotted outline in FIG. 6 and as can be seen more specifically in FIG. 8. The facing panel member 50 includes a plurality of cut outs 53a, 53b, 53c and 53d which, in addition to being directional by reason of the pointed (triangular) end 54, includes a larger rectangular area 55. The back member correspondingly contains triangular red colored indicia 56a, 56b, 56c and 56d and closely proximate thereto an informational message 57a, 57b, 57c and 57d, bearing in the drawings for simplicity the numerals 1, 2, 3 and 4, respectively. Movement of the pointer end 59 (one corner of triangular piece 51) as guided by the code index to any of the four designated positions 60a, 60b, 60c or 60d moves the spot indicia 56 and its corresponding informational message 57 to the positions shown in dotted outline in FIG. 8 and thus into registry with the appropriate cut outs 53a, 53b . . . etc. As shown in FIGS. 6 and 8 at position 1 (designated by reference numeral 60a), spot indicia 56a and its message 57a appears in window cut out 53a, particularly with the red triangular portion in the triangular portion 54 of the cut out and the message 57a in the rectangular portion 55. Movement of pointer 59 to position 2 (designated by reference numeral 60b) will move indicia 56b and message 57b to the position shown in dotted line in FIG. 8, where it will be in registry with cut out 53d in panel 50. Movement to position 3 (designated by reference numeral 60c) will cause indicia 56c and message 57c to appear in window 53c. Movement to position 4 (designated by reference numeral 60d) will bring indicia 56d and message 57d to the position shown in dotted line where it will be in registry and therefore viewable in cut out 53b.

It will be appreciated that any appropriate technical process, operation or assembly of laboratory or industrial apparatus can be superimposed on the facing of the front panel 50 and that the directional cut outs 53 can be located in spaced relationship so that they identify any pertinent portion of the apparatus or of the steps of the operation. Correspondingly, the spot indicia 56 and the messages 57 can be located and the code so arranged that sequential movement to various positions will by the sequential exposure of individual indicia vividly call attention to the particular piece of apparatus or process step of the operation having reference to the data or the information in the message.

FIGS. 6 and 8 also illustrate a further embodiment. Thus, the front panel in addition to the cut outs 53 may be provided with a rectangular cut out 70. Correspondingly, the back panel is provided with spaced messages 71a, 71b, 71c and 71d printed in radial fashion proceeding from pin 52, such that these messages are revealed in sequential fashion as the pointer 59 is moved from position to position to bring the corresponding spot indicia 56a, 56b . . . etc. in registry with the arrow shaped cut outs 53a, 53b . . . etc. The cut outs 53 in this embodiment may be of such size and shape that the rectangular portion 55 is eliminated since the messages 71 will appear at window 70. This latter embodiment is therefore somewhat similar to the embodiment shown in FIGS. 1 through 3, excepting that it is of simpler two-piece construction while the backing member is non-circular in form and is pivotably secured at the corner, rather than at the center.

The rotational securement at the center is usually most desired, of course, since it provides the greatest amount of area for use in providing for spot indicia and also for the datum or informational messages. Thus, the area allowed for the messages or information is much more restricted in the latter embodiment than in the case of the embodiment shown in FIGS. 1 through 3, and the latter is therefore most preferred in accordance with the invention.

The illustration of FIG. 1, as depicting a distillation set up for a laboratory experiment, is not to be considered limitative in any sense of the word since it should be recognized that many other basic chemical processes may be substituted. Thus, in place of a pictorial illustration of the distillation operation there may be depicted in pictorial fashion an arrangement of laboratory apparatus useful for carrying out such operations as titration, preparation of hydrogen or oxygen, qualitative analysis or quantitative analysis, the operations of filtering, chromatography, etc., as well as many others.

It is also envisioned that training aids, in accordance with the present invention, can be designed in accordance with the principles annunciated hereinabove and having utility in widely diverse fields. Thus, it is envisioned that electrical circuitry, the flow of electricity, fluid flow operations and other sciences could be very conveniently and graphically portrayed in a simplified manner. It is also envisioned that the repair of many types of machinery could be graphically illustrated with attention being drawn to critical elements of the particular machinery and such tied in relationship to various data and/or informational messages in the manner described hereinabove. Furthermore, it is envisioned that weapons, machinery and maneuvers employed by the armed services could be illustrated in accordance with the teachings of the present invention. Thus, assembly, disassembly, use and repair techniques could be readily adopted. Furthermore, it is envisioned that war games involving the deployment of troops and/or supplies in relation to opposing forces, terrain, weather, etc. and the like could be graphically illustrated, emphasizing sequentially the several stages or strategic locations by the use of the attention-drawing indicia spaced appropriately in a depicted battlefield, continent, hemisphere or outer space.

The above and many other possibilities will suggest themselves to those skilled in the art and it is, of course, the intent to include all such obvious modifications and applications within the purview of the spirit and scope of the present invention unless specifically delimited by the appended claims; since the specific embodiments as disclosed above are set forth in compliance with the patent statutes requiring the setting forth of a specific mode of practicing the invention and not for the purposes of limitation.

I claim:

1. A technical operation or process illustration device comprising a first planar member bearing a pictorial depiction of said operation or process, said depiction including an array of related elements useful in carrying out the depicted operation, said member including a directional and angular cut out proximate each of said elements and one additional aperture, a second planar member movably affixed to the first planar member in flush relationship on the side opposite said pictorial depiction and being adjustable to any one of several positions, said second planar member bearing a plurality of visible indicia and an equal plurality of explanatory messages, said indicia, said cut outs, said aperture and said explanatory messages being in such preselected location that movement of said second member to any of said several positions exposes simultaneously, through one of said cut outs, one of said indicia and through said aperture an explanatory message appropriate to the element or process step proximate the exposed indicia, said indicia appearance in said directional cut out specifically focusing the viewer's attention to the element to which said explanatory message is related.

2. A technical operation illustration device as claimed in claim 1, wherein said second planar member bears on its rear face a reduced size view of said pictorial depiction and a duplication of said explanatory messages in sequential arrangement corresponding to the arrangement on the viewing side.

3. A technical operation or process illustration device comprising a front panel member bearing a pictorial depiction of said operation or process, said depiction including an array of related elements useful in carrying out the depicted operation, said front panel member including a cut out of directional and angular contour proximate each of said elements and one extra aperture, a rear panel member integrally connected to the front panel member, and being folded over into slightly spaced relationship therewith, a circular disk member rotatably affixed to said rear panel member and being located in between said front and rear panel for movement to any one of several positions, said circular disk bearing a plurality of visible indicia and an equal plurality of explanatory messages, said panel members including a cutaway extending on either side of the folding connection sufficient to allow finger movement of the disk, said indicia, said cut outs, said aperture and said explanatory messages being in preselected spaced relationship whereby movement of said circular disk to any one of said positions will bring one indicia into exposing registry with one of said directional cut outs focusing the viewer's attention on the appropriate element and will bring one of said messages, appropriate to the element or process step proximate the said exposed indicia, into exposing registry with said aperture, said rear panel bearing on its rear face a spot index proximate to said cutaway and said disk bearing on its rear face a plurality of code indicia peripherally located for viewing by reason of said cutaway, said code indicia being angularly spaced in preselected fashion with respect to the indicia on the front face.

References Cited in the file of this patent

UNITED STATES PATENTS

| | | |
|---|---|---|
| 1,587,685 | Tillinghart | June 8, 1926 |
| 2,353,238 | Horr | June 11, 1944 |

FOREIGN PATENTS

| | | |
|---|---|---|
| 151,763 | Great Britain | Oct. 7, 1920 |
| 318,877 | Great Britain | Sept. 9, 1929 |
| 609,520 | Germany | Feb. 18, 1935 |